United States Patent
Kopplin (10) Patent No.: US 7,668,991 B2
(45) Date of Patent: Feb. 23, 2010

(54) ADDRESS ASSIGNMENT TO PLURALITY OF CONNECTING ELEMENTS IN A BUS SYSTEM

(75) Inventor: Sascha Kopplin, Bietigheim-Bissingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/580,388

(22) PCT Filed: Jul. 22, 2004

(86) PCT No.: PCT/DE2004/001621

§ 371 (c)(1),
(2), (4) Date: Feb. 16, 2007

(87) PCT Pub. No.: WO2005/051723

PCT Pub. Date: Jun. 9, 2005

(65) Prior Publication Data
US 2007/0173083 A1   Jul. 26, 2007

(30) Foreign Application Priority Data
Nov. 21, 2003 (DE) ................. 103 54 602

(51) Int. Cl.
G06F 13/00 (2006.01)
G06F 3/00 (2006.01)

(52) U.S. Cl. ........................... 710/104; 710/9
(58) Field of Classification Search ........... 340/667; 381/86; 710/110, 9, 104; 180/271, 273, 180/274; 280/735
See application file for complete search history.

(56) References Cited

U.S. PATENT DOCUMENTS

| 4,660,141 A | * | 4/1987 | Ceccon et al. | 710/9 |
| 4,773,005 A | * | 9/1988 | Sullivan | 710/9 |
| 5,502,438 A | * | 3/1996 | Blevin et al. | 340/825.52 |
| 5,822,707 A | | 10/1998 | Breed et al. | |
| 5,974,475 A | * | 10/1999 | Day et al. | 710/9 |

(Continued)

FOREIGN PATENT DOCUMENTS

DE   101 11 020   9/2002

OTHER PUBLICATIONS

Denuto et al.,, LIN Bus and its Potential For Use in Distributed Multiplex Applications, SAE Technical Paper Series, Society of Automotive Engineers, Warrendale, PA, No. 2001—1-72,2001, pp. 1-9.*

(Continued)

Primary Examiner—Mark Rinehart
Assistant Examiner—Nimesh G Patel
(74) Attorney, Agent, or Firm—Kenyon & Kenyon LLP (57) ABSTRACT

A connecting element is proposed for weight measurement in a vehicle seat, which has connecting means and bus communications means. The connecting means make possible connecting to a single-wire bus. Furthermore, a method is proposed for making possible the bus communications between a control unit as master and at least one connecting element as slave. In this context, an address is assigned to the connecting element for the bus communications as a function of the serial number of the connecting element. Furthermore, a bus system is proposed having a control unit for activating personal protective means as a master, and at least two connecting elements which are configured for weight measurement in a vehicle seat. The bus system is developed as a single-wire bus.

2 Claims, 8 Drawing Sheets

U.S. PATENT DOCUMENTS

| | | | |
|---|---|---|---|
| 6,246,936 B1* | 6/2001 | Murphy et al. | 280/735 |
| 6,271,760 B1* | 8/2001 | Watanabe et al. | 340/667 |
| 6,509,653 B2* | 1/2003 | Fujimoto et al. | 307/10.1 |
| 6,577,023 B1* | 6/2003 | Stanley et al. | 307/10.1 |
| 6,773,029 B2* | 8/2004 | Hamperl et al. | 701/45 |
| 6,809,270 B2* | 10/2004 | Fujita | 177/25.19 |
| 6,871,250 B2* | 3/2005 | Froeschl et al. | 710/110 |
| 6,990,540 B2* | 1/2006 | Dalakuras et al. | 710/110 |
| 2001/0010424 A1* | 8/2001 | Osmer et al. | 280/735 |
| 2002/0074786 A1* | 6/2002 | Hamperl et al. | 280/735 |
| 2002/0171540 A1* | 11/2002 | Ando et al. | 340/457 |
| 2003/0000757 A1* | 1/2003 | Ishida et al. | 180/271 |
| 2003/0040858 A1* | 2/2003 | Wallace | 701/45 |
| 2003/0056997 A1* | 3/2003 | Breed et al. | 177/144 |
| 2004/0071155 A1* | 4/2004 | Marino et al. | 370/452 |
| 2005/0026470 A1* | 2/2005 | Koerwer et al. | 439/76.2 |
| 2005/0043876 A1* | 2/2005 | Fultz et al. | 701/45 |
| 2005/0052060 A1* | 3/2005 | Beloch et al. | 297/284.7 |
| 2005/0090959 A1* | 4/2005 | Winkler | 701/45 |
| 2005/0172462 A1* | 8/2005 | Rudduck et al. | 24/606 |
| 2005/0265344 A1* | 12/2005 | Harris et al. | 370/392 |

OTHER PUBLICATIONS

Specks et al., *LIN Protocol. Development Tools and Software Interface for Local Data Networks in a Motor Vehicle*, VDI Reports, Duesseldorf, Germany, No. 1547, Oct. 5, 2000, pp. 1-24.

Denuto et al.,, *LIN Bus and its Potential For Use in Distributed Multiplex Applications*, SAE Technical Paper Series, Society of Automotive Engineers, Warrendale, PA, No. 2001-1-72, 2001, pp. 1-9.

* cited by examiner

ADDRESS ASSIGNMENT TO PLURALITY OF CONNECTING ELEMENTS IN A BUS SYSTEM

FIELD OF THE INVENTION

The present invention relates to a connecting element and a method for bus communications between a control unit for driving personal protective means as master and at least one connecting element for weight measurement in a seat as slave, and a bus system.

BACKGROUND INFORMATION

A connecting element is already known from German Published Patent Application No. 101 11 020, which, for example, is designed as a bolt or screw and which may be built into the seat without the height of the seat being raised. This connecting element is developed for force measurement and is able, thereby, to measure the force exerted by weight on the vehicle seat. This makes possible passenger classification. In particular, a contactless measurement is available, since, in this case, a magnetic field and a Hall sensor are used.

SUMMARY OF THE INVENTION

The connecting element, according to the present invention, and the method for bus communication between a control unit for driving personal protective means as master and at least one connecting element for weight measurement in a vehicle seat as slave, and the bus system having the features of the independent claims have the advantage that the connecting element is connected as a weight sensor via a single-wire bus to the control unit for activating the personal protective means. The single-wire bus, for example, the so-called LIN bus, is a very simple development of a bus, and, compared to point-to-point connections, saves considerably on lines. In particular, the connecting elements may consequently be connected as weight sensors in a vehicle seat as a group on one bus line. This makes possible a logical bringing together of the weight sensors.

The method according to the present invention also has the advantage that addressing the individual connecting elements, which are operated as slaves, during operation of the bus, takes place using the serial numbers already assigned by the manufacturer for the individual connecting elements. This saves expenditure, and the configuration takes place automatically.

In this context, one has to make sure that the serial numbers of the individual connecting elements are different. In addition, using this procedure, the programming of the individual connecting elements by the vehicle manufacturer may be omitted. In the case of the configuration using a configuration pin, the address is established by coding of the plug.

Advantageous improvements to the connecting element methods for bus communications and a bus system, as set forth in the independent claims, are rendered possible by the measures and further refinements delineated in the dependent claims.

It is of particular advantage that the connecting means in the connecting elements, which are configured for the single-wire bus, make it possible, by hardware coding, to indicate in each case the installation position of the connecting elements. To accomplish this, the connecting means, besides the voltage connection, the data communications connection and the ground connection preferably have a fourth connection which is called the configuration connection, and which indicates the installation position, depending upon its configuration. The configuration connection may, for instance, be connected to the three other lines respectively or may be open, it being possible, thereby, to code four different installation positions. This is sufficient for the use of the connecting elements, which usually have four installation positions in a vehicle seat. This hardware coding also makes possible addressing the connecting elements without prior configuration.

For the communication between master and slave, each slave has to have its own address. In this context, the address may be derived directly from the hardware coding. Another possibility is the configuration of the connecting elements by a master. Delivery from preprogrammed sensors is also conceivable.

Advantageously, the connecting element has its characterizing serial number, which it received during its manufacturing, in a memory, the serial number, as mentioned above, then being used for addressing the connecting elements, in that the control unit, as master, allocates to the connecting element a simple address in the light of the serial number. Via this address, there then takes place the polling request of the connecting element, so that the connecting element may then deliver its data via the bus to the control unit.

Advantageously, the bus configuration is constructed in this instance as a master-slave configuration, since the control unit needs the data of the connecting elements and is thus ideally configured as a master.

In particular, it is provided that the control unit, as master, transmits to the individual slaves, that is, to the connecting elements, in each case a request message, so that the latter shall transmit their data to the control unit. A transmission of several measured values from the same connecting element leads to a lower overhead, so that transmission bandwidth may be saved thereby. However, this requires the use of a toroidal core store.

Synchronizing the measured value recording of all connecting elements may be accomplished by a special command (sampling frame).

Advantageously, the bus system has exactly four connecting elements, which are in each case placed on the seat in order to carry out the weight measurement. This is a configuration that makes a very accurate analysis of the weight load of the vehicle seat possible.

DETAILED DESCRIPTION

According to legal regulations, in future, vehicles will have to identify persons on vehicle seats, in order to be able to activate personal protective means, such as air bags, seat belt tensioners or rollover bars as a function of this identification. Various sensing concepts have been suggested for carrying out this identification. Included among these are, for example, optical sensors, ultrasound sensors, radar sensors, weight-measuring mats built into the seat and also connecting elements configured for measuring the weight of the objects on the vehicle seat. Advantageously, four such connecting elements are used per vehicle seat, which form a rectangle, and can thus measure the weight loading on the vehicle seat very accurately. With this design, it is also possible to perform a kind of profiling of the weight loading.

According to the present invention, it is now provided to connect these connecting elements of a vehicle seat to a single-wire bus. The so-called LIN bus may be used as the single-wire bus, for example. This is a cost-effective single-wire bus which, according to the present invention, is configured for connection to the connecting elements. The configuration relates to the addressing, the identification of the installation position, the bus communication and an error treatment.

Figure 1:
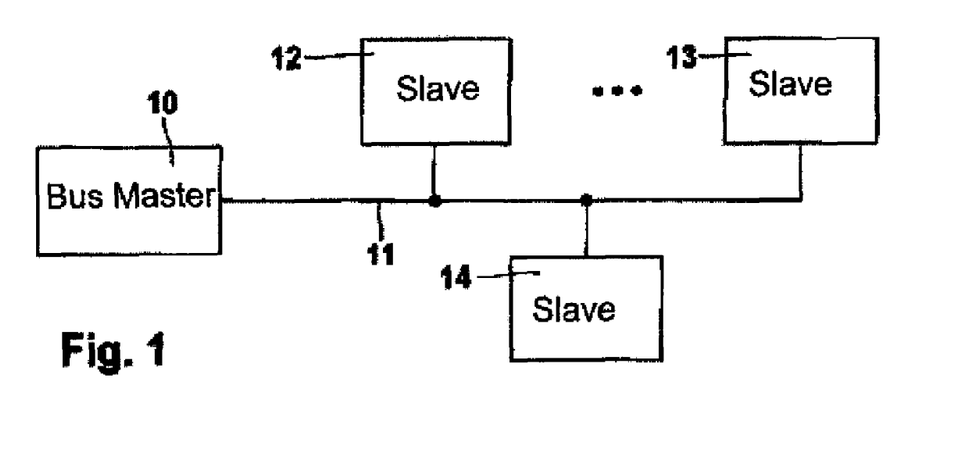
FIG. 1 shows a first block diagram of the bus system.

In a first block diagram, FIG. 1 explains the bus system. A bus master 10, here the control unit for activating the personal protection means, is connected via a single-wire bus 11, that is, for instance, the LIN bus having slaves 12, 13 and 14. In this case, the slaves are the connecting elements which are configured for the weight force measurement in the vehicle seat. In each case an address, a so-called ID, is assigned to slaves 12, 13 and 14, which make possible the addressing by bus master 10. It also makes sense to connect additional sensors to the bus as well. Such a sensor may be a belt lock switch.

Figure 2:
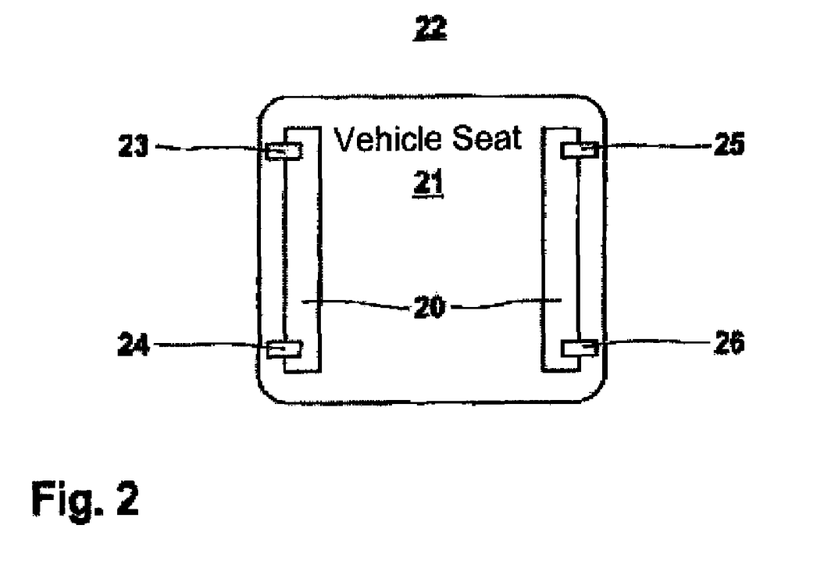
FIG. 2 shows the installation position of the connecting elements.

FIG. 2 explains how the individual connecting elements are installed in the vehicle seat. A vehicle seat 21 has an installation space 20 on which the sensors, that is, connecting elements 23 to 26 are installed. In the figure, at the top at 22 the front of the vehicle is seen, and to the individual sensors 22 to 26, which form a rectangle, for example, serial numbers and ID's are assigned here. The bus connection to the control unit is omitted here, for simplicity's sake. Control unit 10 will usually be located in the vehicle tunnel. Therefore, an electrical connection from the vehicle seat to the chassis of the vehicle is required. In the case of removable seats, this may be done by plug connections or by a wireless connection, such as by an inductive transmitter or a radio connection, or even an optical connection.

At this point, there are two departures:
1. The system (OWS=occupant weight sensing) has its own control unit, which may be directly integrated into the seat, and communicates with the central control unit via a bus. The data processing occurs in the OWS control unit, in this context.
2. The sensors communicate directly with the central control unit. The data processing occurs in the central control unit.

Figure 3:
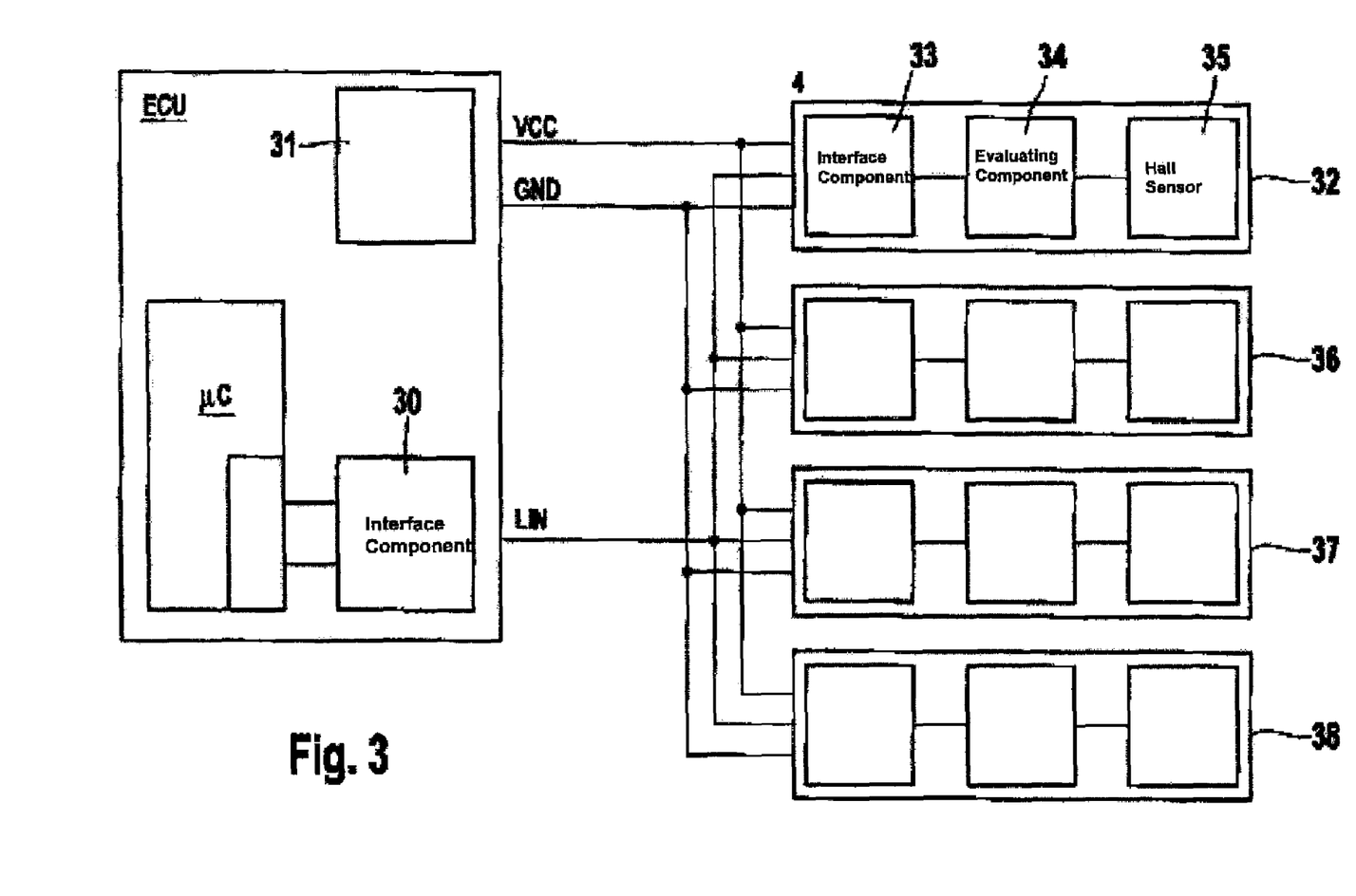
FIG. 3 shows a second block diagram of the bus system

FIG. 3 explains, in a second block diagram, the bus system according to the present invention. Control Unit ECU has a microcontroller μC which processes the sensor signals and activates personal protective means as a function of this. Sensors and other components in the ECU, as well as the connections to the personal protective means located outside the ECU are left out here, for simplicity's sake.

Microcontroller μC has a port SCI (serial communication interface) which is connected to an interface component 30. This interface component 30 makes possible the communication via the single-wire bus. The so-called LIN is used here as the single-wire bus. The data are transmitted via this line LIN. As the return line, ground GND is used, that is the ground connection, which connects control unit ECU to sensors 32, 36, 37, 38. Data line LIN is also connected to the data communications connections of sensors 32, 36, 37, 38. An additional line VCC leads from control unit ECU to the individual sensors 32, 36, 37, 38. This line VCC is used for the voltage supply of the sensors. In this connection, alternative concepts are possible, for example, that the voltage supply of the sensors might take place directly via the vehicle's voltage supply system or that the energy for the sensors might be transmitted via the data line. The sensors are all constructed equally. As an example, we explain this here for sensor 32. Sensor 32 has sensor element 35, a Hall sensor, in this case, which, in cooperation with a magnetic field, generated by a permanent magnet, generates a signal characterizing the weight. This signal is supplied by sensor element 35 to an evaluating component 34, which not only amplifies and filters the signal but also digitizes and processes it. This signal may then be transmitted to control unit ECU via an interface component 33. Interface component 33 thus represents the so-called physical layer for the LIN bus. At this point, there takes place the conversion to the data message that is transmitted by sensor 32 to control unit ECU. The other three sensors 36, 37 and 38 have the same design. For the sake of simplicity, the memory, in which the serial numbers of the respective sensors is included, is assigned to component 34.

Alternatively, the sensor may also be made up of a Hall sensor and a special ASIC. Then the ASIC includes all the above-named functions. Just as conceivable is a Hall sensor which already has signal processing and an interface (LIN).

Figure 5:
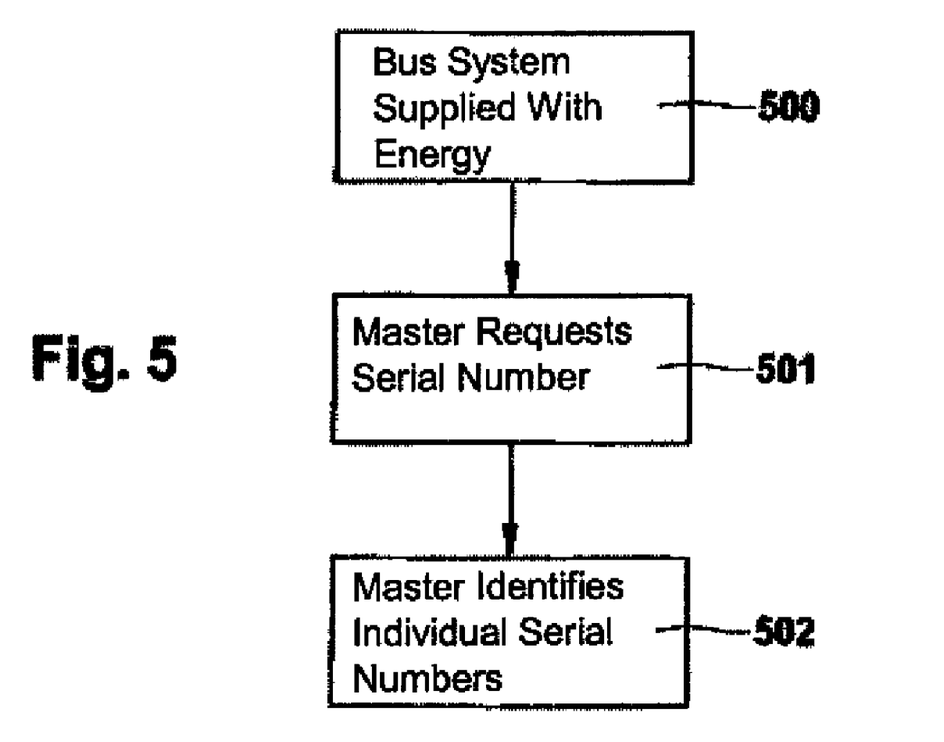
FIG. 5 shows a first flow chart.

In a flow chart, FIG. 5 explains the initializing of the bus system according to the present invention. In method step 500, the bus system is supplied with energy, for instance, by closing the ignition lock of the vehicle. In the case of an automatic configuration, control unit ECU will first of all request sensors 32, 36, 37 and 38 to name their serial numbers, in order then to assign to them respectively an address, that is, an ID. The serial number has, for instance, a length of 32 bits, and is stored in the memory of the sensor by the sensor manufacturer.

The polling for the serial numbers runs, for instance, as follows. At 501, the master requests a certain serial number. Three possibilities are given as the answer:
1. The master receives a response which indicates that none of the connected slaves has the corresponding serial number. In this case, none of the slaves responds.
2. The master receives a response which indicates that a slave has this number and has responded to it.
3. The master receives a response which indicates that slaves have responded, but the parity check, that is, the check sum, is wrong.

This simply indicates that two or more slaves have responded, and that the question was still too nonspecific. For, the question is formulated in such a way that only the highest or the higher bits of the serial number are asked for, while the lower valued bits may have a zero or a one, that is, they have no influence on the response. For instance, let the serial number have a length of 32 bits, and let the first four bits be ones, then all slaves respond that have a serial number in which the first four bits are ones. The slaves that have a zero in the first four bits do not respond to this. At 502, the master proceeds in this manner to identify the individual serial nimbers in order then to program an identification number into the individual sensor. For if a conflict occurs, that is, that several sensors respond to one question, the next lower bits will have to be specified. If all connected sensors have responded, then this sensor will have an ID, that is, an address programmed into it. In this manner, the bus system configures itself automatically.

Figure 9:
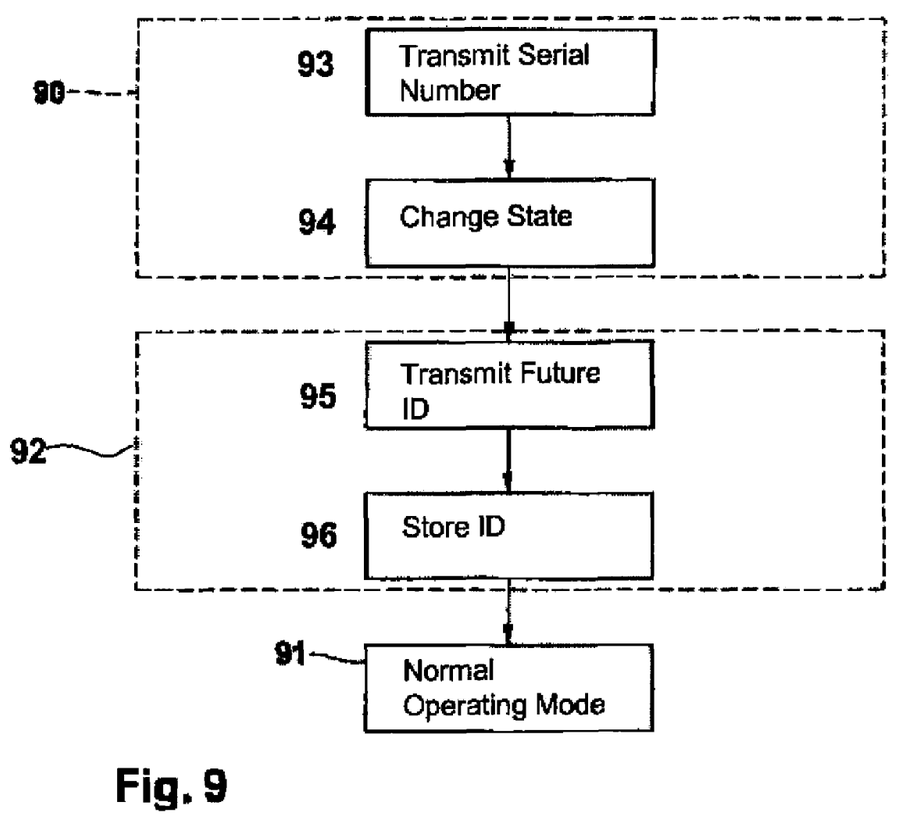
FIG. 9 shows a second flow chart.

FIG. 9 shows a possibility of how one may assign an address (LIN-ID) to the sensors during the configuration phase. After a switching on or a reset of the system, it is in initializing phase 90. In this phase 90, each sensor has one LIN-ID, but the same one for each, to make communication possible. Control unit ECU now transmits a serial number, at 93, to all the sensors. In this context, as described above, control unit ECU is able to ascertain the serial numbers automatically, or they are available to control unit ECU in the internal memory. The sensor having the same serial number now changes into programming state 1, 94, and the others remain in the initializing state. In a subsequent phase 92, control unit ECU transmits, at 95, the future LIN-ID of the sensor. At 96, the sensor stores the ID and goes over into normal operating mode at 91. A one-time programming is equally conceivable. In this context, the sensor would transfer directly from the initializing phase into normal operating mode. The configuration may also be accomplished by hardware coding.

Figure 4:
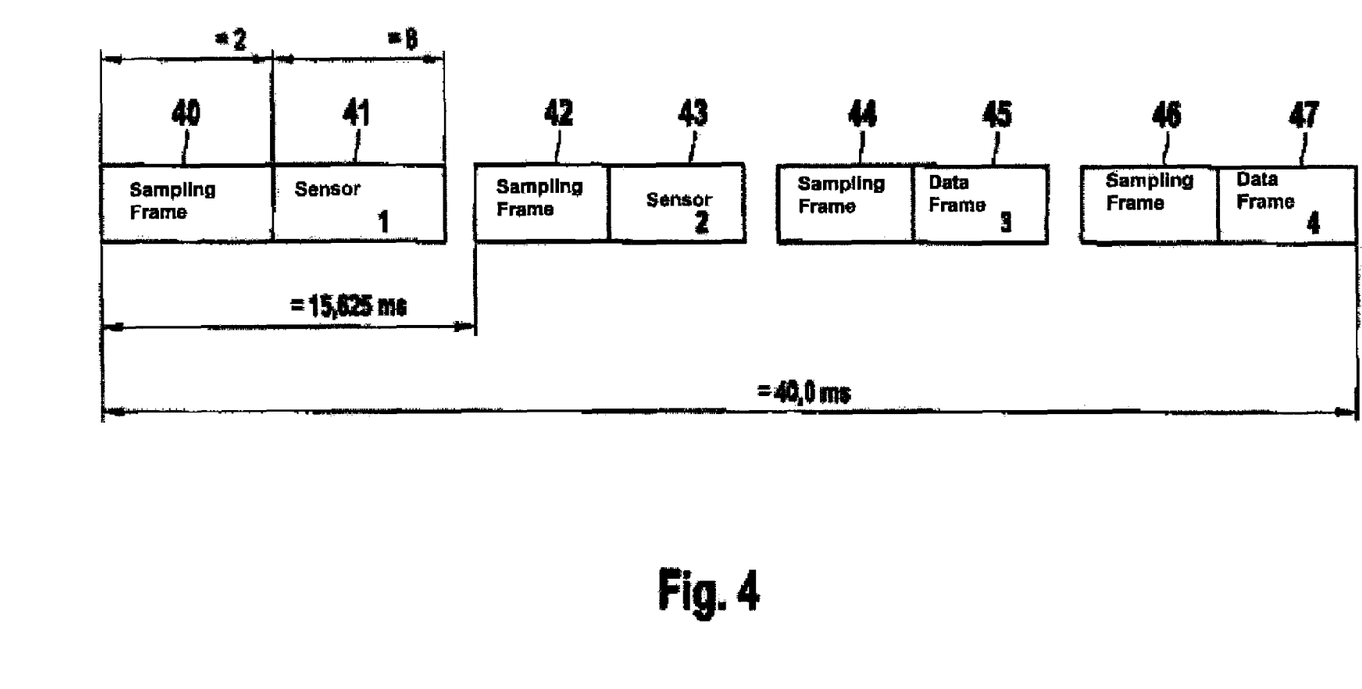
FIG. 4 shows a transmission frame.

FIG. 4 explains the data traffic on data line LIN. Control unit ECU sends a sampling frame at specified time intervals in order to ensure a synchronous and accurately timed scanning of all sensors. After each sampling frame, control unit ECU reads the measured values of the sensors. This can take place by subsequent reading of the measured values of sensor 1, sensor 2, sensor 3 and sensor 4. In the case shown in FIG. 4, the sensor responds with 4 measured values after a read request. The sequence looks as follows. Control unit ECU sends a sampling frame 40. Subsequently, control unit ECU sends a read request, for sensor 1, 41, which thereupon responds with 4 measured values. After that, control unit ECU again sends a sampling frame, 42, and subsequently control unit ECU reads the last 4 measured values of sensor 2, 43. There then follows sampling frame 44, data frame 45, sampling frame 46 and data frame 47. Since the application requires scanning rates of 64 Hz, there follows from this the time T_sampling of 15.625 ms. The time to bus communication T_FRAME_TYP for 4×4 measured values usually amounts to 40 ms. In the case of polling of each individual measured value of all sensors after each sampling frame, the typical transmitting time would increase.

Figure 6:
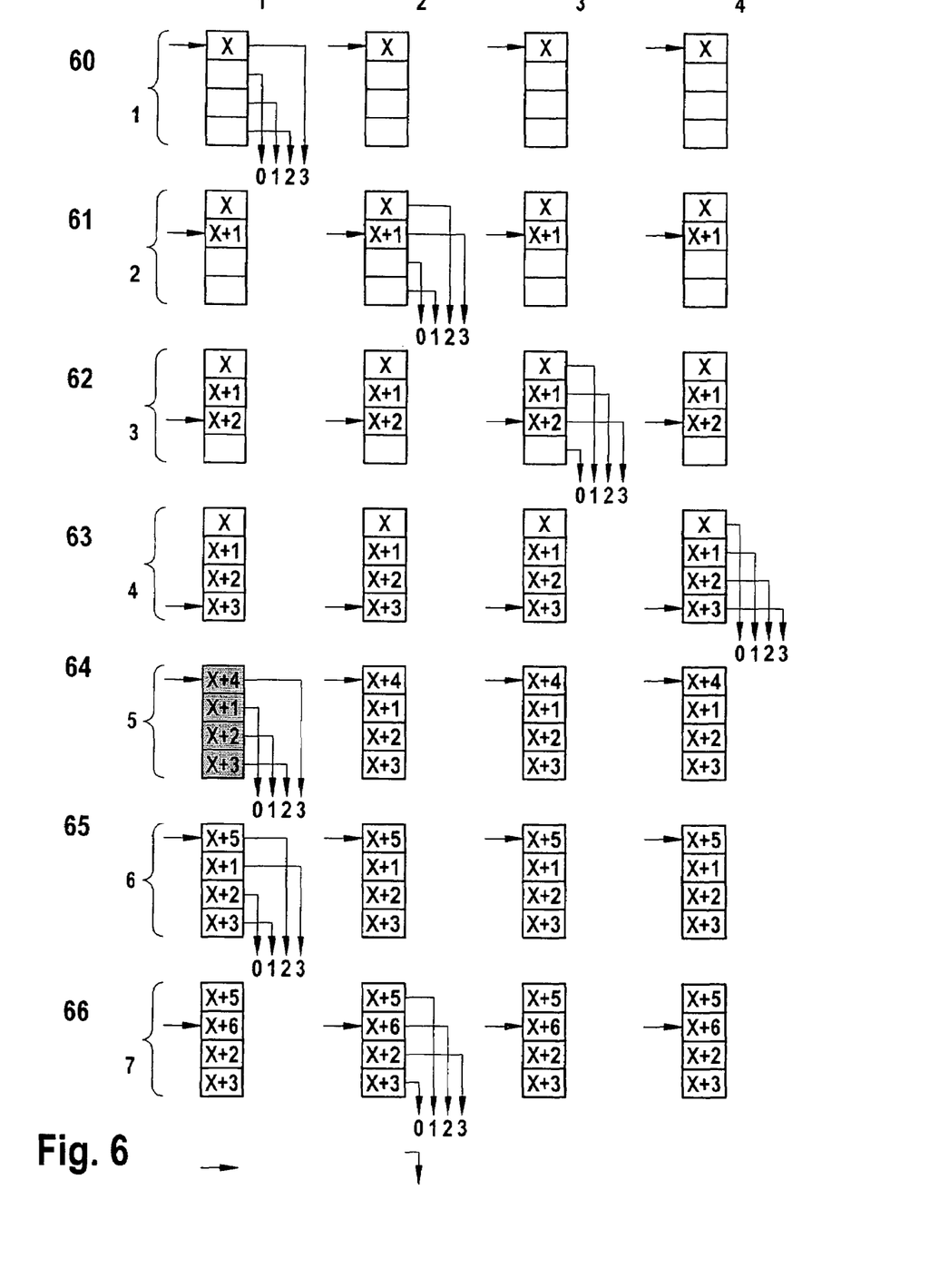
FIG. 6 shows a first example of the organization of the toroidal core store.

As shown above, only a single sensor is polled between the sampling frames to supply its data. This makes possible a greater bandwidth than the customary LIN communication. However, it requires that the individual sensors have a toroidal core store. In this toroidal core store, measured values are stored consecutively. By using an indicator, one may call up the individual values in the toroidal core store. FIG. 6 shows how this ring buffer store or toroidal core store is organized. If the sensors receive a request message (sampling frame) from the master, an analog-to-digital converter in the sensor is triggered, and the indicator is incremented by one value. The newly measured value is stored at a current address in the toroidal core store. When the sensor data are to be read out, the last four stored data in the toroidal core store are sent to the master.

In this context, the oldest value is usually input as the first value into the response message. If a transmission error should occur, the master is not allowed to poll again, since the bandwidth is very limited. The master subsequently sends a special request message (sampling frame). Then the sensor triggers the analog-to-digital converter again, but does not change the indicator position. In the next step, the master then reads the data from the same sensor. As a result there is then missing a polling value for all four sensors. If the master were to continue without this mechanism, 4 consecutive values of a sensor, and thus 4 consecutive values for the calculation of the total weight, would be missing.

In line 60, FIG. 6 shows that in sensor 1 the four values are being read. In line 61 this takes place in sensor 2, in line 62 in sensor 3 and in line 63 in sensor 4. As indicated in the individual blocks in the sensors in the various lines, the toroidal core store shown here always grows by one value. In line 63, sensors 1 to 4 have stored values in all four memory cells. In line 64 there now comes about a transmission error in the newest value, during the reading out of sensor 1. Thereupon, in line 65, the master requests of the sensors, by a special sampling frame, that they replace the last value by a new one. Subsequently, sensor 1 transmits its data. Thus the result in lines 65 and 66 is that the three values x+1, x+2, x+3 as well as the new value x+5 are transmitted. In line 67, sensor 2 is then read out in the old way. Now, however, the indicator has moved down by one value, so that the last value in memory cell x+5 is in third place in the data message.

Figure 7:
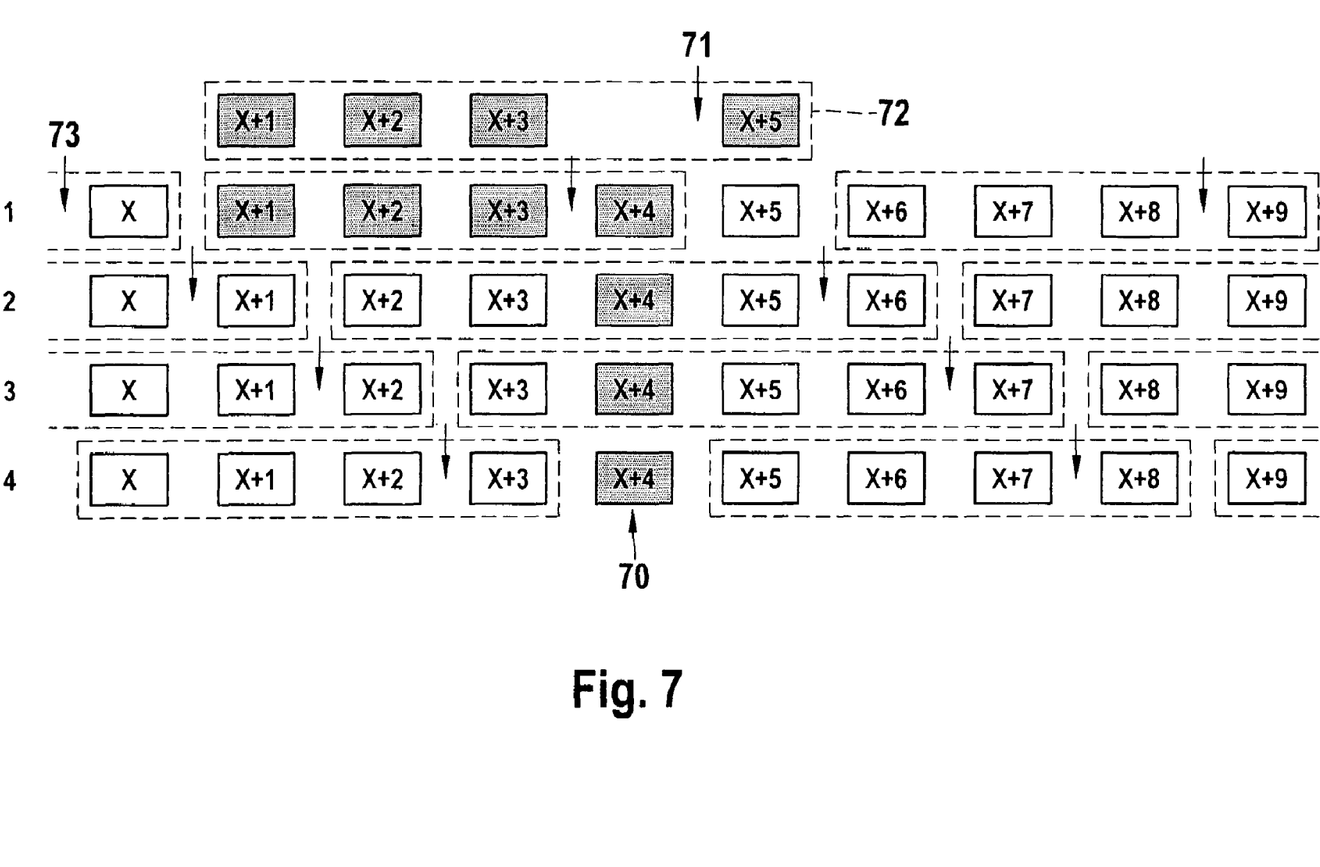
FIG. 7 shows a second example of the organization of the toroidal core store.

In FIG. 7 it is explained once more what happens if there is an error. The figure shows the data that are received by the master. Data x+4 from sensors 1 to 4, that are marked 70, have been lost because of the conflict in reading the data of sensor 1 (line 64 in FIG. 6). Instead, the data x+1, x+2, x+3 and x+5 are transmitted at the second reading.

Figure 8:
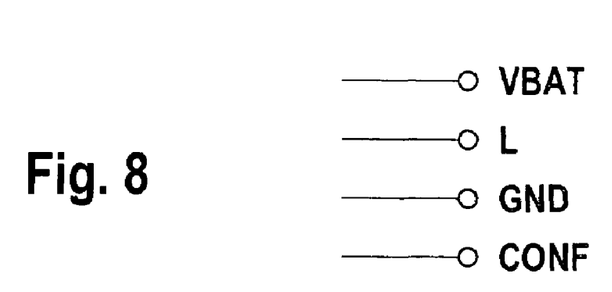
FIG. 8 shows the connecting means in the connecting element.

FIG. 8 shows the connecting means of sensors 32, 36, 37 and 38 to connection VBAT, to which line VCC is connected, and in addition there is connection L, that is connected to line LIN, and connection GND that is also connected to line GND so as to be used as master connection. In addition, a connection CONF is provided here which is used for establishing the LIN-ID as well as for the identification of the installation position. For this, four possibilities are given. Connection CONF may be switched to connections VBAT or L or GND, or may be open. With that, then, 4 conditions, 4 LIN-ID's and therewith also four installation positions are coded (the coding of the installation position taking place via the wiring harness). An interface component of the sensor has to evaluate the CONF connection correspondingly. The initializing of the address is able to take place with each switching on of the operating voltage. A programming of the unprogrammed sensors along with the first switching on of the operating voltage is also conceivable.

What is claimed is:

1. A system for weight measurement in a vehicle seat, comprising:
   a plurality of connecting elements;
   a communications system; and
   an address assignment arrangement;
   wherein, for assignment of an address to one of the plurality of connecting elements:
      the system is configured such that:
         in a step (a), at least one bit of a potential serial number is sent across the communications system to all of the plurality of connecting elements, each of a subset of the plurality of connecting elements having a respective serial number that includes a portion that matches the at least one bit of the potential serial number;
         responsively, in a step (b), the subset of the immediately preceding step (a) responds to the at least one bit, others of the connecting elements not responding; and
         in a step (c), the steps (a) and (b) are repeated;
      for each repeated step (a), the at least one bit includes a range of bits in addition to or alternate to the at least one bit that was sent in the immediately preceding step (a), the subset of the connecting elements being different for different ones of the repeated steps (a);
      the repetition of steps (a) and (b) is performed until the subset of the last performed step (b) includes only the one of the plurality of connecting elements;
      the address assignment arrangement is configured to assign to the one of the plurality of connecting elements an address based on the at least one bit sent in the last step (a) performed for the assignment of the address; and at least in the initial performance of step (a), the at least one bit includes less than the entirety of the potential serial number.

2. The system as recited in claim 1, wherein steps (a) to (c) are repeated for assignment of addresses to others of the plurality of connecting elements until all of the plurality of connecting elements have been assigned addresses or until all potential serial numbers have been sent out.

* * * * *